(12) United States Patent
Sasaki et al.

(10) Patent No.: US 12,536,651 B2
(45) Date of Patent: Jan. 27, 2026

(54) MEDICAL INFORMATION PROCESSING APPARATUS GENERATING HUMAN BODY DATA BASED ON MEDICAL IMAGE DATA

(71) Applicant: CANON MEDICAL SYSTEMS CORPORATION, Tochigi (JP)

(72) Inventors: Naoki Sasaki, Otawara (JP); Hitoshi Yamagata, Otawara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 480 days.

(21) Appl. No.: 17/938,521

(22) Filed: Oct. 6, 2022

(65) Prior Publication Data

US 2023/0025920 A1  Jan. 26, 2023

Related U.S. Application Data

(63) Continuation of application No. PCT/JP2021/014965, filed on Apr. 8, 2021.

(30) Foreign Application Priority Data

Apr. 8, 2020  (JP) .................................. 2020-069794
Sep. 23, 2020  (JP) .................................. 2020-158243

(51) Int. Cl.
*G06T 7/00*  (2017.01)
*G16H 30/40*  (2018.01)

(52) U.S. Cl.
CPC ........... *G06T 7/0012* (2013.01); *G16H 30/40* (2018.01); *G06T 2207/30024* (2013.01)

(58) Field of Classification Search
CPC ......... G06T 7/0012; G06T 2207/30024; G06T 15/08; G06T 17/10; G06T 19/00;
(Continued)

(56) References Cited

U.S. PATENT DOCUMENTS 11,657,508 B2 *  5/2023  Richter ................. A61B 6/037
600/425
2004/0230458 A1  11/2004  Takayama et al.
(Continued)

FOREIGN PATENT DOCUMENTS

JP  2012-35009 A  2/2012
JP  2016-101502 A  6/2016
(Continued)

OTHER PUBLICATIONS

Ghani ("On Forecasting Lung Cancer Patients", https://carleton.scholaris.ca/server/api/core/bitstreams/2cb2512e-5a55-4e5f-9e66-abe8e8f2ed9a/content, pp. 10-17, Sep. 2019) (Year: 2019).*
(Continued)

*Primary Examiner* — Juan M Guillermety
(74) *Attorney, Agent, or Firm* — Oblon, McClelland, Maier & Neustadt, L.L.P.

(57) ABSTRACT

A medical information processing apparatus according to an embodiment includes storage circuitry and processing circuitry. The storage circuitry is configured to store therein human body data structured with a plurality of voxels. The processing circuitry is configured to generate human body data by causing each of the voxels in the human body data to store therein composition information based on information about an anatomical structure of a human body, a data value based on medical image data, and relevance to an adjacent voxel.

20 Claims, 10 Drawing Sheets

(58) Field of Classification Search
CPC ........ G16H 30/40; G16H 50/50; A61B 5/055;
A61B 6/00; A61B 6/03
See application file for complete search history.

(56) References Cited

U.S. PATENT DOCUMENTS

| | | |
|---|---|---|
| 2016/0155236 A1 | 6/2016 | Davey |
| 2016/0300346 A1* | 10/2016 | Milz ..................... G06T 7/0012 |
| 2017/0197115 A1 | 7/2017 | Cook et al. |
| 2018/0174298 A1 | 6/2018 | Schadewaldt |
| 2019/0251755 A1* | 8/2019 | Douglas .................. G06T 13/00 |
| 2020/0027546 A1 | 1/2020 | Nasu |
| 2020/0184099 A1* | 6/2020 | Yang ..................... G06F 21/602 |
| 2021/0150714 A1 | 5/2021 | Buerger et al. |

FOREIGN PATENT DOCUMENTS

| | | |
|---|---|---|
| JP | 2017-508561 A | 3/2017 |
| JP | 2018-79012 A | 5/2018 |
| JP | 2019-508191 A | 3/2019 |
| JP | 2020-14551 A | 1/2020 |
| WO | WO 2019/141543 A1 | 7/2019 |

OTHER PUBLICATIONS

International Search Report issued Jun. 8, 2021 in PCT/JP2021/014965 filed Apr. 8, 2021, 3 pages.
Caon, M., "Voxel-Based Computational Models of Real Human Anatomy: A Review", Radiat Environ Biophys, 42, 2004, 7 pages.
Japanese Office Action issued Jun. 5, 2024 in Japanese Patent Application No. 2020-158243, 4 pages.

* cited by examiner (CT VALUE, T1, T2, PD, CT VALUE (DE), ACOUSTIC IMPEDANCE, ELASTIC MODULUS, COMPOSITION (PROTEIN, BONE, ETC.), TUMOR/NORMAL, CHARACTERISTICS OF CELL, RELEVANCE)

MEDICAL INFORMATION PROCESSING APPARATUS GENERATING HUMAN BODY DATA BASED ON MEDICAL IMAGE DATA

CROSS-REFERENCE TO RELATED APPLICATIONS

This application is a continuation of PCT international application Ser. No. PCT/JP2021/014965, filed on Apr. 8, 2021 which designates the United States, incorporated herein by reference, and which claims the benefit of priority from Japanese Patent Applications No. 2020-069794, filed on Apr. 8, 2020; and Japanese Patent Application No. 2020-158243, filed on Sep. 23, 2020, incorporated herein by reference.

FIELD

Embodiments described herein relate generally to a medical information processing apparatus and a medical information processing method.

BACKGROUND

Virtual anatomical data of human bodies has conventionally been used for displaying medical images. For example, a technique is known by which display can be switched between an image based on virtual anatomical data and medical image data while positions are kept in correspondence with each other, by aligning the positions between the virtual anatomical data and the medical image data on the basis of an anatomical landmark, the virtual anatomical data including a voxel set having a three-dimensional alignment similar to a three-dimensional arrangement of voxels in the medical image data.

DETAILED DESCRIPTION

Figure 1:
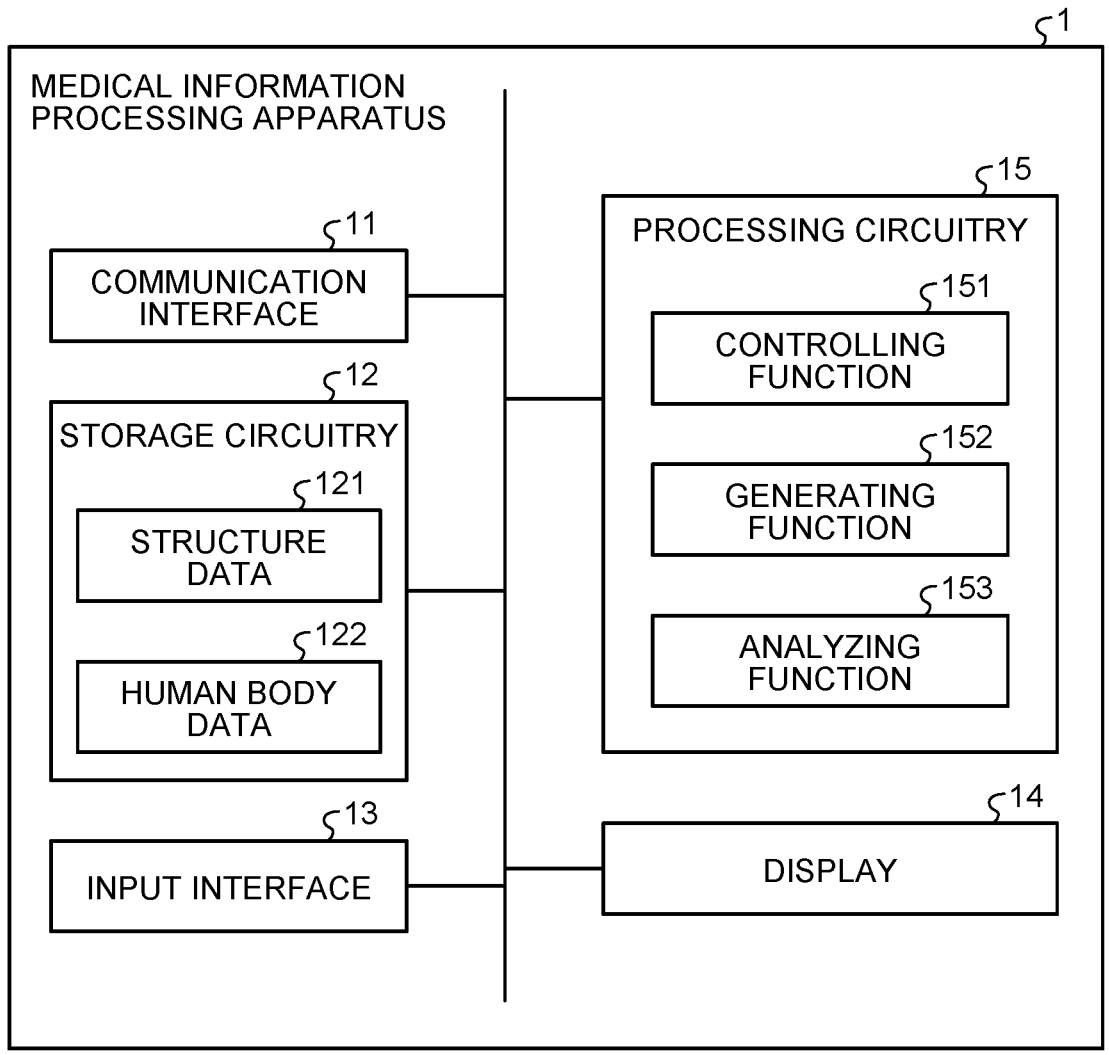
FIG. 1 is a block diagram illustrating an exemplary configuration of a medical information processing apparatus according to a first embodiment.

According to an embodiment, a medical information processing apparatus includes storage circuitry and processing circuitry. The storage circuitry is configured to store therein human body data structured with a plurality of voxels. The processing circuitry is configured to generate human body data by causing each of the voxels in the human body data to store therein composition information based on information about an anatomical structure of a human body, a data value based on medical image data, and relevance to an adjacent voxel.

Exemplary embodiments of a medical information processing apparatus and a medical information processing method will be explained in detail, with reference to the accompanying drawings. Possible embodiments of the medical information processing apparatus and the medical information processing method of the present disclosure are not limited to the embodiments described below. Further, it is possible to combine any of the embodiments with one or more other embodiments and/or conventional techniques so long as no conflict occurs in the processing. Further, in the following explanations, some of the constituent elements that are the same as each other will be referred to by using the same reference characters, and duplicate explanations thereof will be omitted.

First Embodiment

A configuration of a medical information processing apparatus according to a first embodiment will be explained. FIG. 1 is a block diagram illustrating an exemplary configuration of a medical information processing apparatus 1 according to the first embodiment. As illustrated in FIG. 1, the medical information processing apparatus 1 includes a communication interface 11, storage circuitry 12, an input interface 13, a display 14, and processing circuitry 15. The medical information processing apparatus 1 may be communicably connected to various types of apparatuses in a network (not illustrated) via the network.

The communication interface 11 is connected to the processing circuitry 15 and is configured to control communication performed with the apparatuses provided in the network (not illustrated). More specifically, the communication interface 11 is configured to receive various types of information from the apparatuses and to output the received information to the processing circuitry 15. For example, the communication interface 11 is realized by using a network card, a network adaptor, or a Network Interface Controller (NIC).

The storage circuitry 12 is connected to the processing circuitry 15 and is configured to store therein various types of data. For example, the storage circuitry 12 has stored therein various types of data received from the apparatuses provided in the network (not illustrated) and processing results obtained by the medical information processing apparatus 1. Further, the storage circuitry 12 has stored therein various types of computer programs (hereinafter, "programs") used for realizing various types of functions as being read and executed by the processing circuitry 15. Further, as illustrated in FIG. 1, the storage circuitry 12 has stored therein structure data 121 and human body data 122. The structure data 121 and the human body data 122 will be explained in detail later. For example, the storage circuitry 12 is realized by using a semiconductor memory element such as a Random Access Memory (RAM) or a flash memory, or a hard disk, an optical disk, or the like.

The input interface 13 is connected to the processing circuitry 15 and is configured to receive various types of instructions and operations to input information, from an operator. More specifically, the input interface 13 is configured to convert the input operations received from the operator into electrical signals and to output the electrical signals to the processing circuitry 15. For example, the input interface 13 is realized by using a trackball, a switch button, a mouse, a keyboard, a touchpad on which an input operation can be performed by touching an operation surface thereof, a touch screen in which a display screen and a touchpad are integrally formed, a contactless input circuit using an optical sensor, an audio input circuit and/or the like. In the present disclosure, the input interface 13 does not necessarily have to include one or more physical operation component parts such as a mouse, a keyboard, and/or the like. For instance, possible examples of the input interface 13 include an electrical signal processing circuit configured to receive an electrical signal corresponding to an input operation from an external input device provided separately from the apparatus and to output the electrical signal to the processing circuitry.

The display 14 is connected to the processing circuitry 15 and is configured to display various types of information and images. More specifically, the display 14 is configured to convert the information and data of the images sent thereto from the processing circuitry 15 into display-purpose electrical signals and to output the electrical signals. For example, the display 14 is realized by using a liquid crystal display, a Cathode Ray Tube (CRT) display, an organic Electroluminescence (EL) display, a plasma display, a touch panel, or the like.

The processing circuitry 15 is configured to control operations of the medical information processing apparatus 1 in accordance with the input operations received from the operator via the input interface 13. For example, the processing circuitry 15 is realized by using a processor.

A configuration of the medical information processing apparatus 1 according to the first embodiment has thus been explained. Through processes performed by the processing circuitry 15, the medical information processing apparatus 1 structured as described above makes it possible to provide human body data that can be used for various types of analyses. Next, details of the medical information processing apparatus 1 according to the present embodiment will be explained. As illustrated in FIG. 1, the processing circuitry 15 included in the medical information processing apparatus 1 is configured to execute a controlling function 151, a generating function 152, and an analyzing function 153. In this situation, the controlling function 151 is an example of the output unit. The generating function 152 is an example of the generating unit. The analyzing function 153 is an example of the analyzing unit.

The controlling function 151 is configured to exercise control so that processes corresponding to various types of requests input via the input interface 13 are performed. For example, the controlling function 151 controls transmission and reception of various types of information performed via the communication interface 11, storing of information into the storage circuitry 12, the display of various types of information on the display 14, and the like. The controlling function 151 is configured to control an output of human body data generated by the generating function 152. This feature will be explained in detail later.

The generating function 152 is configured to generate the human body data by causing each of a plurality of voxels in human body data structured with the voxels to store therein composition information based on information about an anatomical structure of a human body, data values based on medical image data, and relevance to adjacently-positioned voxels (hereinafter, "adjacent voxels"). More specifically, the generating function 152 is configured to form subdivided data structured with the plurality of voxels each having a predetermined size and to further generate human body data 122 by causing each of the voxels in the subdivided data to hold therein the composition information based on the information about the anatomical structure of the human body, the data values in the medical image data estimated on the basis of the information about the anatomical structure, and the relevance to the adjacent voxels determined on the basis of the information about the anatomical structure.

More specifically, the generating function 152 is configured to generate the subdivided data obtained by subdividing a standard human body model into the plurality of voxels and to generate the human body data by causing each of the voxels in the generated subdivided data to hold therein the composition information, the data values, and the relevance. For example, the generating function 152 generates the subdivided data by subdividing, into the plurality of voxels, the standard human body model based on the structure data 121 stored in the storage circuitry 12.

In this situation, the structure data 121 is standard data related to the anatomical structure of the human body and includes external structure data and internal structure data of the human body. For example, the external structure data includes data related to the shape of the body surface of the human body. Further, for example, the internal structure data includes data related to bones, muscles, ligaments, internal organs, sensory organs, blood vessels, nerves, and the like. The structure data 121 is the data defining, with respect to these external structures and internal structures, standard positional relationships and sizes. The structure data 121 is stored into the storage circuitry 12 by the controlling function 151, in accordance with an operation performed by the operator via the input interface 13.

Figure 2A:
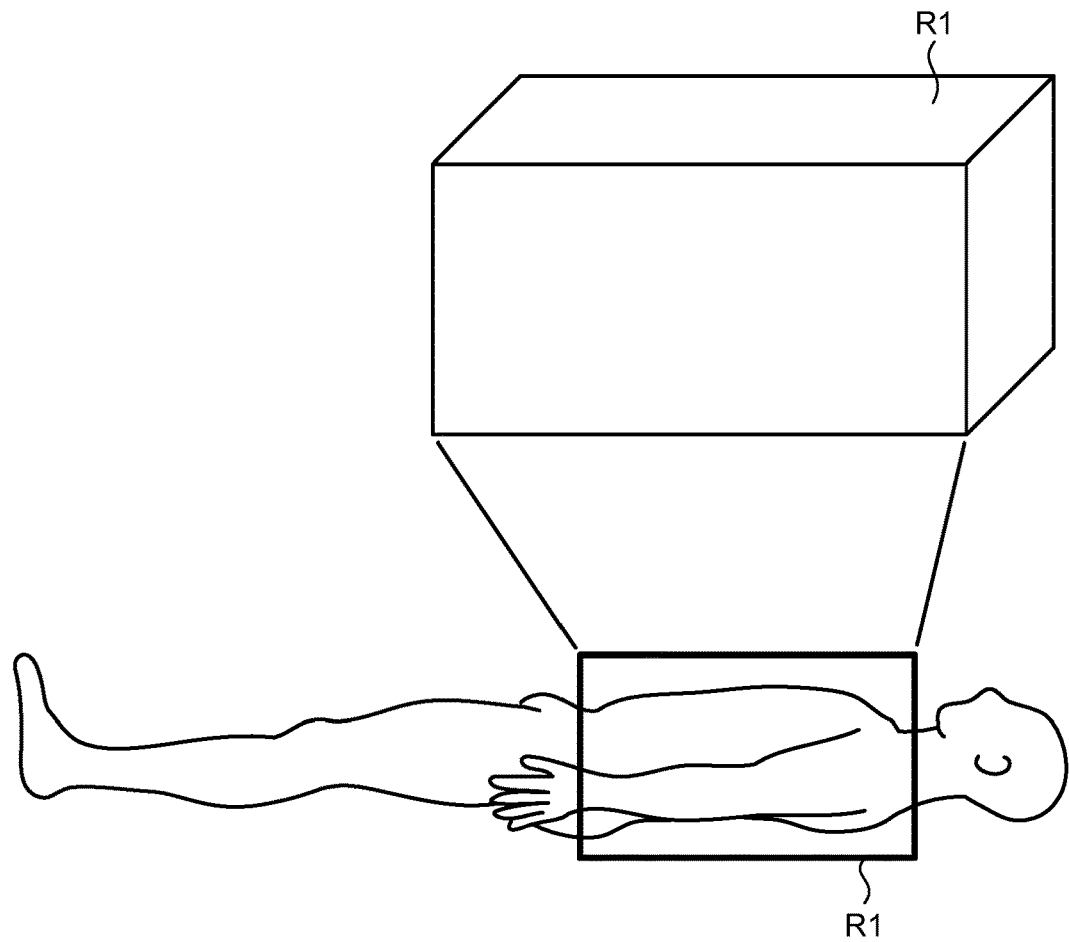
FIG. 2A is a drawing for explaining an example of a subdivided data generating process performed by a generating function according to the first embodiment.
Figure 2B:
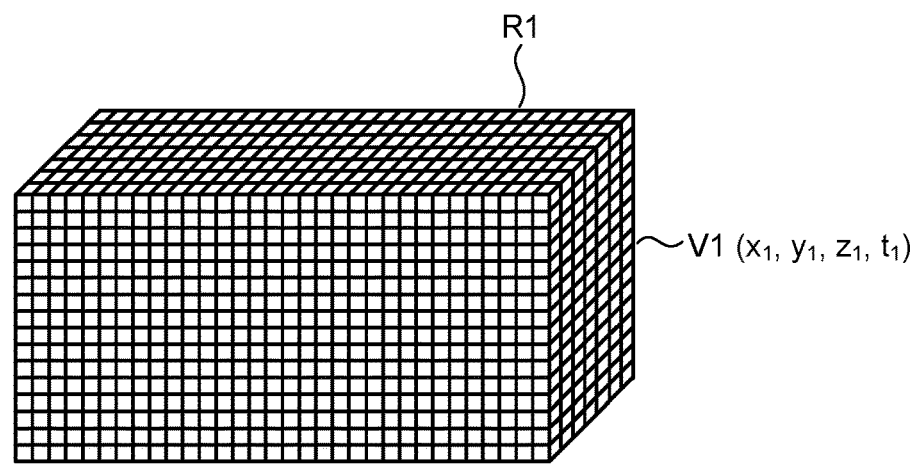
FIG. 2B is a drawing for explaining another example of the subdivided data generating process performed by the generating function according to the first embodiment.

FIGS. 2A and 2B are drawings for explaining an example of the subdivided data generating process performed by the generating function 152 according to the first embodiment. Although FIGS. 2A and 2B illustrate an example in which subdivided data of a region R1 including the chest and the abdomen is generated, the generating function 152 is configured to generate subdivided data of the entire body by using the structure data 121.

For example, as illustrated in FIG. 2A, the generating function 152 is configured to obtain a standard human body model of the region R1 including the chest and the abdomen, by using the external structure data and the internal structure data of the chest and the abdomen included in the structure data 121. Further, as illustrated in FIG. 2B, the generating function 152 is configured to generate the subdivided data by subdividing the obtained standard human body model of R1 by using a predetermined voxel size. Although not illustrated in FIG. 2B, the region R1 includes the standard human body model of the chest and the abdomen, and the standard human body model is thus subdivided.

In this situation, to each of the voxels in the subdivided data generated by the generating function 152, position information is assigned. For example, as illustrated in FIG. 2B, to a voxel V1 included in the region R1, position information ($x_1$, $y_1$, $z_1$) indicating the position of the voxel V1 within the region R1 is assigned. It is also possible to assign time information to each of the voxels included in the subdivided data. For example, to the voxel V1, time information ($t_1$) may be assigned.

Figure 3:
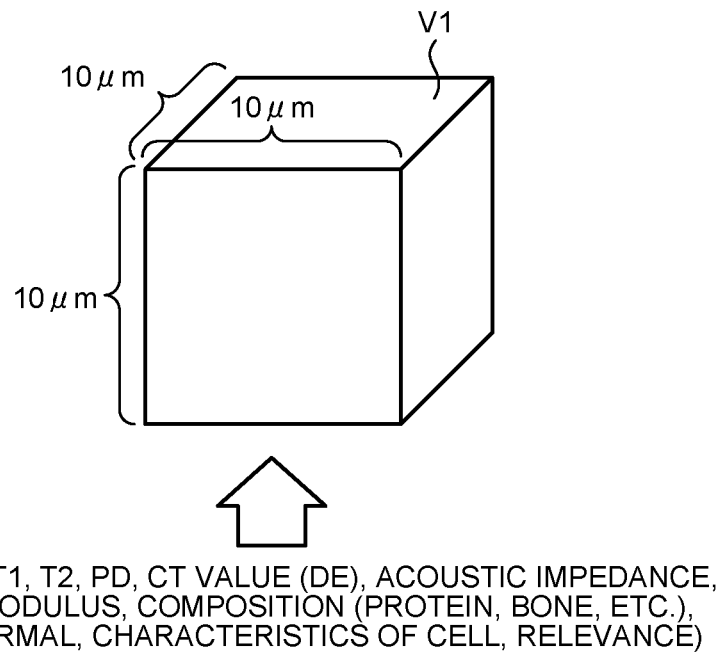
FIG. 3 is a drawing for explaining an example of a voxel in the subdivided data according to the first embodiment.

Further, the generating function 152 is capable of subdividing the standard human body model by using voxels having an arbitrary size. For example, the generating function 152 subdivides the standard human body model by using voxels each having a size similar to the size of cells in the human body. FIG. 3 is a drawing for explaining an example of a voxel in the subdivided data according to the first embodiment. For example, as illustrated in FIG. 3, the generating function 152 generates the subdivided data by subdividing the standard human body model by using voxels of which each side measures "10 μm".

The generating function 152 is configured to generate the human body data by causing each of the voxels in the subdivided data generated in this manner to hold therein the composition information based on the information about the anatomical structure of the human body, the data values in the medical image data estimated on the basis of the information about the anatomical structure, and the relevance to adjacent voxels determined on the basis of the information about the anatomical structure.

More specifically, the generating function 152 identifies a tissue of the human body corresponding to each of the voxels structuring the subdivided data on the basis of the information about the anatomical structure and further causes each of the voxels to hold therein composition information of the identified tissue. In other words, on the basis of the position information within the region R1, the generating function 152 identifies whether each of the voxels corresponds to an external structure or an internal structure of the human body. Further, the generating function 152 causes each of the voxels to hold therein the composition information of the identified structure.

For example, on the basis of the position information, the generating function 152 identifies to which of the following each of the voxels corresponds: a bone, a muscle, a ligament, an internal organ, a sensory organ, a blood vessel, and a nerve. On the basis of identified results, the generating function 152 causes each of the voxels to hold therein the composition information indicating protein, bones, or the like, as illustrated in FIG. 3. Further, the generating function 152 is also capable of causing each of the voxels to hold therein information about the identified site.

Further, the generating function 152 is configured to cause each of the voxels to hold therein the data values in the medical image data estimated on the basis of the information about the anatomical structure. For example, on the basis of the composition information and the information about the site held in each of the voxels, the generating function 152 estimates the data values in the medical image data of various types with respect to each voxel and causes the voxel to hold therein the estimated data values.

For example, as illustrated in FIG. 3, the generating function 152 estimates, with respect to each of the voxels, data values (parameters) such as a CT value, an X-ray attenuation coefficient, a T1 value, a T2 value, a Proton Density (PD) value, an acoustic impedance, an elastic modulus, and/or the like and causes each of the voxels to hold therein the estimated data values.

Further, the generating function 152 causes each of the voxels in the subdivided data to hold therein the relevance represented by one or both of: composition information of the adjacent voxels; and a characteristic indicating relevance to a tissue corresponding to the adjacent voxels. In other words, the generating function 152 causes each of the voxels to hold therein the information indicating what the adjacent voxels are like.

Figure 4A:
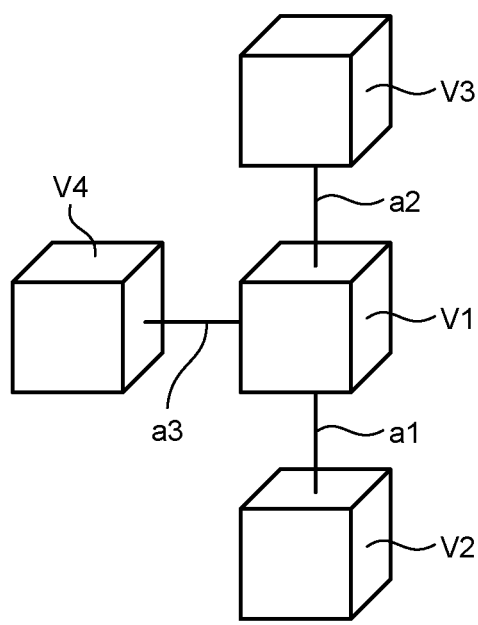
FIG. 4A is a drawing for explaining relevance held in human body data according to the first embodiment.
Figure 4B:
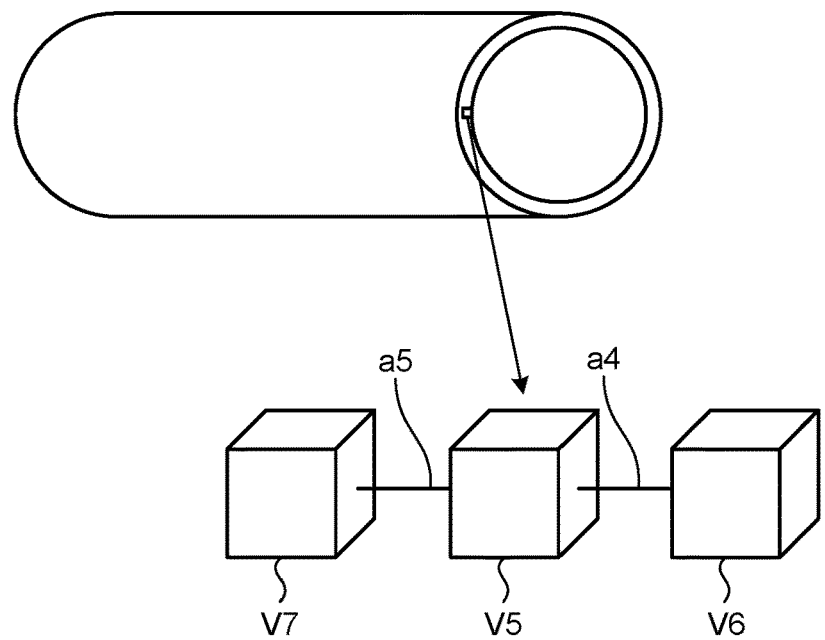
FIG. 4B is another drawing for explaining the relevance held in the human body data according to the first embodiment.

FIGS. 4A and 4B are drawings for explaining the relevance held in the human body data according to the first embodiment. Although FIGS. 4A and 4B illustrate the adjacent voxels as being positioned apart from one another for the sake of convenience in the explanation, the voxels are in contact with one another in actuality. For example, as illustrated in FIG. 4A, the generating function 152 causes the voxel V1 to hold therein relevance a1 to an adjacent voxel V2, relevance a2 to another adjacent voxel V3, and relevance a3 to yet another adjacent voxel V4.

In this situation, the generating function 152 causes the relevance to the adjacent voxels to be held while being kept in correspondence with the directions of adjacency. For example, the generating function 152 causes the voxel V1 to hold therein the relevance a1 kept in correspondence with the direction of the voxel V2, the relevance a2 kept in correspondence with the direction of the voxel V3, and the relevance a3 kept in correspondence with the direction of the V4.

For example, when the voxels V1 to V3 correspond to a bone, whereas the voxel V4 corresponds to a ligament, the generating function 152 causes the voxel V1 to hold therein composition information "bone", to hold therein "bone" as the relevance a1 and the relevance a2, and to hold therein "protein (collagen)" as the relevance a3. Similarly, the generating function 152 causes each of all the voxels to hold therein relevance to the adjacent voxels thereof. For example, the generating function 152 causes the voxel V4 to hold therein relevance "bone" kept in correspondence with the direction of the voxel V1.

The relevance to the adjacent voxels does not necessarily have to be the composition information described above. It is also acceptable to hold tissue information or a characteristic indicating relevance to a tissue. For example, as illustrated in FIG. 4B, when a voxel V6 corresponding to blood and a voxel V7 corresponding to a blood vessel wall are positioned adjacent to a voxel V5 corresponding to the internal wall surface of the blood vessel, the generating function 152 may cause the voxel V5 to hold therein relevance to the voxel V6 and the voxel V7, by causing a characteristic indicating relevance to the tissue corresponding to each of the adjacent voxels to be held.

In an example, the generating function 152 causes the voxel V5 to hold therein a skid resistance value to fluid as relevance a4 in the direction of the voxel V6 corresponding to blood. Further, the generating function 152 causes the voxel V5 to hold therein a spring constant indicating elasticity or a coupling coefficient indicating the strength of coupling with respect to the tissue of the voxel V5 in relation to the tissue of the blood vessel wall, as relevance a5 in the direction of the voxel V7 corresponding to the blood vessel wall. In this manner, as the relevance to the adjacent voxels, the generating function 152 is able to cause each of the voxels to hold therein the characteristic which the voxel has in relation to the adjacent voxels.

As described above, the generating function 152 causes each of the voxels in the human body data to hold therein an arbitrary combination made up of: the information indicating the compositions of the adjacent voxels; the information indicating the tissue which is structured with the compositions and to which the voxel belongs; and the information about the physical properties which the voxel has in relation to the adjacent voxels. For example, the generating function 152 causes each of the voxels in the human body data to hold therein the information about the compositions of the adjacent voxels, the information about the tissues to which the adjacent voxels belong, and the information about the physical properties which the voxel has in relation to the adjacent voxels, so as to be kept in correspondence with the directions of adjacency of the adjacent voxels.

In this situation, as described above, when the subdivided data is generated by subdividing the entire standard human body model by using the voxels each having a size similar to the size of cells, so as to generate the human body data by causing each of the voxels to hold therein the composition information of the voxel and the relevance (e.g., the composition information, the characteristics. and the like) to the adjacent voxels, because the number of voxels is extremely large, the generation of the human body data involves a lot of trouble. To cope with this situation, the generating function 152 is also capable of generating human body data by virtually changing the size of the voxels in the human body data 122 stored in the storage circuitry 12, in accordance with the purpose of use of the human body data. For example, the generating function 152 is also capable of generating human body data having voxels of each of which the size is similar to the size of each of the voxels in medical image data and generating, in accordance with the purpose of use of the human body data, human body data in which the size of the voxels can locally be changed.

In that situation, for example, the generating function 152 obtains the standard human body model by using the structure data 121 and generates subdivided data by subdividing the obtained standard human body model by using the voxels each having the size similar to that of each of the voxels in medical image data. Further, as described above, the generating function 152 generates the human body data by causing each of the voxels in the subdivided data to hold therein the composition information based on the information about the anatomical structure of the human body, the data values based on the medical image data, and the relevance to the adjacent voxels determined on the basis of the information about the anatomical structure and further stores the generated human body data into the storage circuitry 12.

Further, the generating function 152 locally changes the voxel size of the human body data 122 corresponding to the purpose. In one example, when the human body data 122 is to be used while focusing on the chest, the generating function 152 virtually changes the voxel size of the chest in the human body data 122. For example, the generating function 152 virtually subdivides the voxels of the chest each having a size similar to the size of each of the voxels in the medical image data, so as to have a size at a cell level. In this situation, to the voxels at the cell level resulting from the virtual subdividing process, composition information data values, and relevance may be assigned on the basis of the various types of information held in the voxels before the subdividing process. Alternatively, as described above, each of the voxels resulting from the subdividing process may store therein the composition information, the data values, and the relevance, on the basis of the information about the anatomical structure.

As described above, by generating at first the human body data 122 having the voxels of each of which the size is similar to the size of each of the voxels in the medical image data and making it possible to locally change the voxel size in accordance with the purpose of use of the human body data 122, it is possible to save the trouble in the generation of the human body data 122 and to easily prepare human body data corresponding to each purpose.

Figure 5:
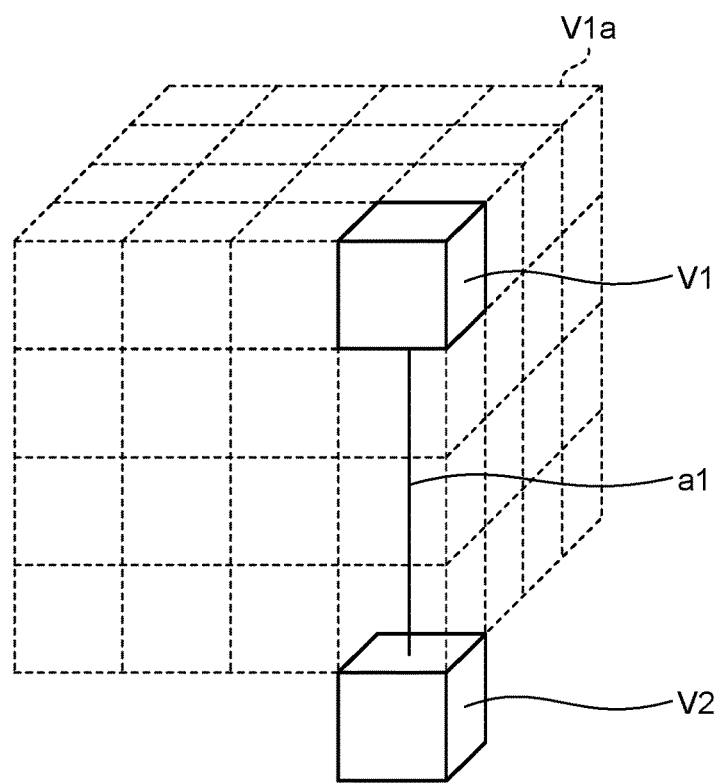
FIG. 5 is a drawing for explaining additional voxels in the human body data according to the first embodiment.

Further, the generating function 152 is configured to generate human body data in which additional voxels are appended to each of the voxels, for the purpose of addressing the growth of a child into an adult or enlargement of a tissue caused by cell proliferation of cancer cells or the like. FIG. 5 is a drawing for explaining the additional voxels in the human body data according to the first embodiment. Although FIG. 5 illustrates a state in which the additional voxels are appended to the voxel V1, additional voxels like those illustrated are appended to each of all the voxels in actuality.

For example, as indicated with the voxel V1 in FIG. 5, the generating function 152 appends a plurality of additional voxels V1a drawn with broken lines to the voxel V1 in the human body data. In this situation, the additional voxels Via are voxels to be used in response to the growth of cells and are normally held while being made invisible (in an unused state). In other words, as illustrated in FIG. 5, the generating function 152 generates the human body data in which, while the voxel V2 is positioned adjacent to the voxel V1, the voxel V1 is caused to hold therein the relevance a1 to the voxel V2.

Further, when generating human body data of which the volume has increased due to the growth of a child into an adult or cell proliferation of cancer cells or the like, the generating function 152 uses the additional voxels that are made visible and brought into a used state, as voxels corresponding to a tissue enlarged due to the cell proliferation. For example, with respect to the already-generated human body data, upon receipt of an operation to increase the volume with a designation of an arbitrary tissue, the generating function 152 identifies a voxel corresponding to the tissue in the designated position. After that, in accordance with a change amount in the volume, the generating function 152 changes the additional voxels appended to the identified voxel into the state of being used. Further, the generating function 152 causes the additional voxels that have been changed into the used state to hold various types of information therein. In an example with reference to FIG. 5, the generating function 152 generates the human body data by making visible, from among the additional voxels Via appended to the voxel V1, additional voxels of which the quantity corresponds to the increased volume, further causing the visible additional voxels V1a to hold composition information and the like therein, and updating the position information. On such occasion, the information being held about the relevance among the adjacent voxels is also updated.

As explained above, by appending the additional voxels to the human body data, it is possible to easily generate the human body data having the different size, without the need to reconstruct the human body data. Although the quantity of the additional voxels appended to each voxel is arbitrary, it is also acceptable to append additional voxels in a quantity that can accommodate the largest possible increase amount.

Figure 6:
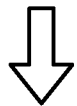
FIG. 6 is a drawing for explaining positional changes of voxels in the human body data according to the first embodiment.

Further, the generating function 152 is also capable of causing each of the voxels in the human body data to hold therein information about a characteristic of a tissue. For example, the generating function 152 is capable of causing a voxel of which the position changes due to a shape change or a joint movement to hold therein information indicating a movable range and a change amount. FIG. 6 is a drawing for explaining positional changes of voxels in the human body data according to the first embodiment. In the present example, FIG. 6 illustrates the voxels in the human body data two-dimensionally.

For instance, let us discuss an example in which the voxels V11 to V18 illustrated in FIG. 6 are voxels corresponding to a joint that allows flexion and extension while using the voxel V14 as the pivot point. In this situation, the generating function 152 causes the voxel V14 to hold therein information indicating a movable range and a change amount. In one example, on the basis of information about an anatomical structure, the generating function 152 causes the voxel V14 to hold therein information indicating that, at the time of flexion, a 90-degree turn is made in a flexion direction (toward the bottom in the drawing). As a result, with respect to the voxels V11 to V18, it is possible to easily generate human body data corresponding to the time of extension (the top section of FIG. 6) and human body data corresponding to the time of flexion (the bottom section of FIG. 6).

As described above, the generating function 152 is configured to generate the human body data by causing the voxels in the subdivided data formed by the voxels each of which has the size at the cell level to hold therein the composition information, the data values, and the relevance to the adjacent voxels. Further, the generating function 152 is configured to store the generated human body data into the storage circuitry 12.

Figure 7:
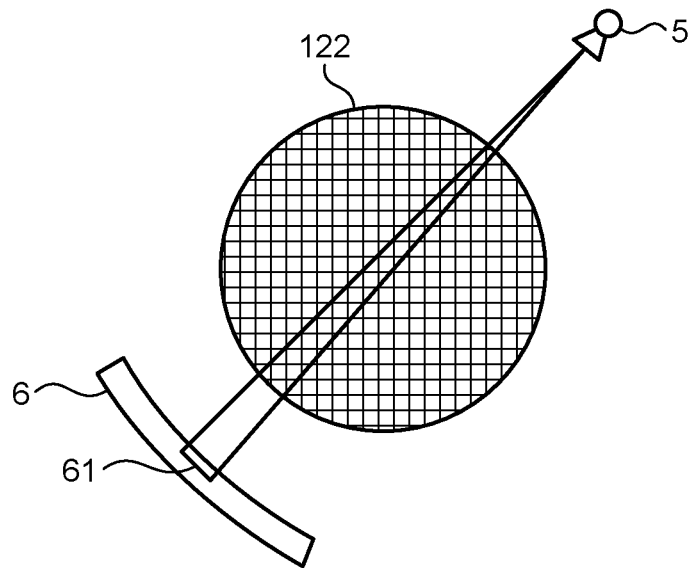
FIG. 7 is a drawing for explaining an example of a simulation performed by an analyzing function according to the first embodiment.

By using the human body data generated in this manner, the analyzing function 153 is capable of performing various types of analyses. More specifically, the analyzing function 153 is configured to perform an analyzing process by using the data of the voxels in the human body data 122 and to output a result of the analyzing process. For example, by using the data of the voxels in the human body data, the analyzing function 153 calculates a simulation image of an imaging process performed by a medical image diagnosis apparatus. In one example, the analyzing function 153 calculates the simulation image, by changing the size of the voxels in the human body data in accordance with an apparatus condition of the medical image diagnosis apparatus, further calculating the data values in the post-change voxels by using the data values stored in the voxels in the human body data before the size change, and using the human body data being structured with the voxels of which the size has been changed and holding therein the calculated data. FIG. 7 is a drawing for explaining an example of a simulation performed by the analyzing function 153 according to the first embodiment. In the present example, FIG. 7 illustrates an example of a simulation of a CT scan using the human body data 122.

In this situation, in the human body data 122, each of the voxels resulting from the subdividing process holds therein a CT value or an X-ray attenuation coefficient estimated on the basis of an anatomical structure. Accordingly, by using the human body data 122 structured in this manner, it is possible to perform a virtual CT scan.

For example, as illustrated in FIG. 7, the analyzing function 153 performs a virtual scan on the human body data 122, by using a virtual X-ray tube 5 and a virtual X-ray detector 6. More specifically, the analyzing function 153 calculates the intensity of X-rays at a detecting element 61 by using either the CT values or the X-ray attenuation coefficients in the voxels through which the X-rays have passed, the X-rays being emitted from the virtual X-ray tube 5 and becoming incident to the detecting element 61 of the virtual X-ray detector 6. By similarly calculating the intensity of X-rays at each of all the detecting elements of the virtual X-ray detector 6, the analyzing function 153 acquires X-ray projection data from the position of the virtual X-ray tube 5 illustrated in FIG. 7. Further, the analyzing function 153 performs the virtual CT scan on the human body data 122, by acquiring X-ray projection data from various directions while rotating the virtual X-ray tube 5 and the virtual X-ray detector 6 and further performing an image reconstruction process.

In this situation, in the human body data 122 generated by the generating function 152, it is possible to change the size of the voxels. Accordingly, even when the focal point size of the virtual X-ray tube 5 or the size of the detecting elements in the virtual X-ray detector 6 is reduced, the analyzing function 153 is capable of accurately calculating absorption of the passing X-rays. For example, reducing the size of the voxels (e.g., down to the cell level) at a site subject to the simulation, it is possible to acquire virtual CT image data reflecting differences in the CT value or the X-ray attenuation coefficient among the voxels through which the X-rays pass, even when the focal point size of the virtual X-ray tube 5 or the size of the detecting elements of the virtual X-ray detector 6 is reduced. Accordingly, by using the human body data 122, the analyzing function 153 is able to realize, through the simulation, the virtual CT scan using the virtual X-ray tube 5 and the virtual X-ray detector 6 having a focal point size and a detecting element size that are difficult to be realized at the present point in time.

For example, the analyzing function 153 is configured to acquire various types of data by performing virtual CT scans while using the virtual X-ray tube 5 and the virtual X-ray detector 6 placed under various conditions. Analyzing the acquired pieces of data is able to contribute to improvement of efficiency in developing X-ray tubes and X-ray detectors.

Further, for example, the analyzing function 153 is configured to acquire reconstructed data by performing reconstruction processes using various methods on the X-ray projection data obtained through the virtual CT scan performed on the human body data 122. Analyzing the acquired pieces of reconstructed data is able to contribute to development of a reconstruction method suitable for CT image data having a higher resolution, for example.

Further, for example, the analyzing function 153 is configured to acquire processing results by performing filtering processes using various methods on the X-ray projection data obtained through the virtual CT scan performed on the human body data 122. Analyzing the acquired processing results is able to contribute to development of a filtering process that is highly effective in reducing noise, eliminating scattered rays, and reducing various types of artifacts, for example.

Further, in the human body data 122 generated by the generating function 152, because each of the voxels holds therein the composition information and the relevance to the adjacent voxels, it is possible to realize a simulation having a higher level of precision, by taking the composition information and the relevance to the adjacent voxels into account with the result of a simulation based on the data values held in the voxels.

For example, the analyzing function 153 performs a simulation by using the data values held in the voxels and evaluates a result of the simulation by comparing the simulation result with the composition information held in the voxels. In one example, on the human body data 122, the analyzing function 153 performs a virtual Magnetic Resonance (MR) scan by using pulse sequences corresponding to various types of Magnetic Resonance Imaging (MRI), while using a T1 value, a T2 value, a Proton Density (PD) value, and the like serving as parameters related to MRI and held in the voxels. Further, comparing MR image data obtained through the virtual MR scans with the composition information held in the voxels is able to contribute to development of pulse sequences that is more suitable for purposes.

Further, the analyzing function 153 is able to calculate the simulation image, by changing the size of the voxels in the human body data in accordance with an imaging parameter of an imaging process performed by a medical image diagnosis apparatus, further calculating the data values in the post-change voxels by using the data values stored in the voxels in the human body data before the size change, and using the human body data being structured with the voxels of which the size has been changed and holding therein the calculated data. In that situation, for example, the analyzing function 153 includes: a setting function configured to diversely change the imaging parameter such as the voxel size of the MR image data or an imaging range; and an image generating function configured to perform an analyzing process on the basis of the human body data 122 and the imaging parameter so as to calculate an MR image to be obtained when an MR scan is performed by using the imaging parameter.

In the human body data 122, each of the voxels resulting from the subdividing process holds therein the T1 value, the T2 value, the PD value, and the like. Accordingly, in accordance with the voxel size serving as the imaging parameter, the analyzing function 153 performs a process of joining/dividing the voxels in the human body data 122. During the process of joining/dividing the voxels, a T1 value, a T2 value, or a PD value corresponding to the joined/divided voxel is obtained by performing a calculating process (e.g., to calculate an average or a weighted average) on the T1 values, the T2 values, or the PD values held in the voxels. The analyzing function 153 generates and outputs a virtual MR scan image on the basis of human body data 122 in which the voxel size has diversely been changed.

Further, for example, the analyzing function 153 is capable of outputting a virtual ultrasound image, by using, with respect to the human body data 122, an acoustic impedance value serving as a parameter related to ultrasound imaging and held in each of the voxels. More specifically, the analyzing function 153 is configured to generate a virtual ultrasound image by estimating an ultrasound wave to be generated by transducer elements of an ultrasound probe on the basis of geometry and an imaging parameter of the ultrasound probe, and further simulating propagation of the estimated ultrasound wave on the basis of the acoustic impedance stored in each of the voxels in the human body data.

For example, ultrasound images obtained by an ultrasound diagnosis apparatus are determined depending on the geometry (the pitch of the transducer elements that transmit and receive an ultrasound wave, the quantity of the transducer elements, and the arrangement formation (e.g., sector or convex) of the transducer elements) and an imaging parameter (e.g., timing of the transmission/reception and a drive intensity of the transducer elements) of an ultrasound probe. The analyzing function 153 includes: a setting function configured to cause the storage circuitry 12 to store therein information about the geometry and information about the imaging parameter of the ultrasound probe, and the like; and an image generating function configured to perform an analyzing process on the basis of the acoustic impedance values of the human body data 122, the information about the geometry and the information about the imaging parameter of the ultrasound probe, so as to calculate an ultrasound image to be obtained when an ultrasound scan is performed by using the imaging parameter.

On the basis of the geometry and the imaging parameter of the ultrasound probe, the image generating function is configured to calculate an ultrasound wave to be generated by the transducer elements of the ultrasound probe. Further, a reception signal of the ultrasound wave to be received by the transducer elements is calculated by simulating propagation of the generated ultrasound wave within the human body model defined with the acoustic impedance values of the human body data 122. On the basis of the reception signal of the ultrasound wave, the virtual ultrasound image is generated and output.

Further, the analyzing function 153 is configured to perform a simulation by using the data values and the information about the relevance to the adjacent voxels (the information about the compositions, the information about the tissues, and the information about the physical properties of the adjacent voxels) held in the voxels. For example, by using the information about the relevance stored in the voxels, the analyzing function 153 is also capable of calculating, through the simulation, a movement of a joint, a movement of a blood flow in a blood vessel, or the like and acquiring a virtual medical image by using a result of this type of simulations. In one example, the analyzing function 153 is capable of obtaining, through a simulation, a blood flow image acquired by an ultrasound wave, by using a result of the simulation performed on the movement of the blood flow in the blood vessel.

Further, for example, the analyzing function 153 is also capable of performing a simulation by using the data values held in the voxels and further changing a result of the simulation by using the relevance to the adjacent voxels. In one example, the analyzing function 153 is configured to extract a boundary between tissues by using the relevance to the adjacent voxel and to correct the values in positions corresponding to the boundary between the tissues within the result of the simulation.

Figure 8:
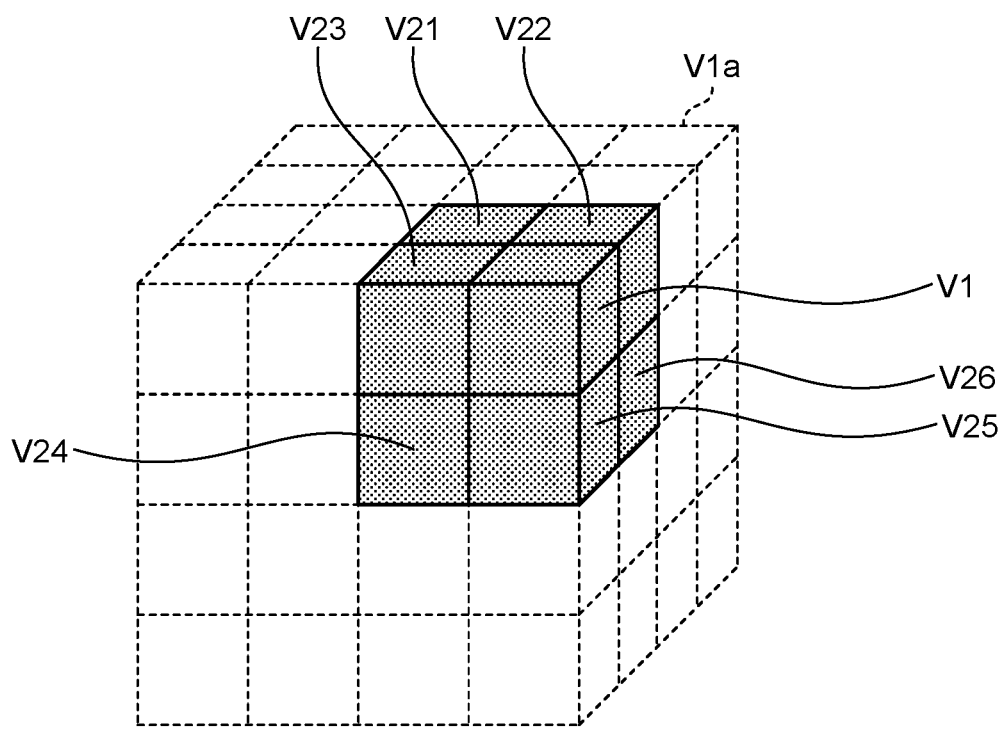
FIG. 8 is a drawing for explaining another example of a simulation performed by the analyzing function according to the first embodiment.

Further, in the human body data 122 generated by the generating function 152, because the additional voxels are appended to each of the voxels, it is possible to use the human body data 122 for a simulation using the additional voxels. FIG. 8 is a drawing for explaining another example of a simulation performed by the analyzing function 153 according to the first embodiment.

For example, as illustrated in FIG. 8, the analyzing function 153 generates human body data in a state where the voxel V1 has become cancerous and proliferated, by using additional voxels V21 to V26 that are among the plurality of additional voxels Via. Further, the analyzing function 153 generates pieces of human body data by diversely changing the malignancy level of the cancer in the voxel V1 and the additional voxels V21 to V26. In other words, the analyzing function 153 changes the data values depending on the malignancy levels of the cancer. After that, by performing a virtual scan by using the plurality of pieces of human body data generated in this manner, the analyzing function 153 is able to obtain simulation results corresponding to the various states of the cancer.

Figure 9:
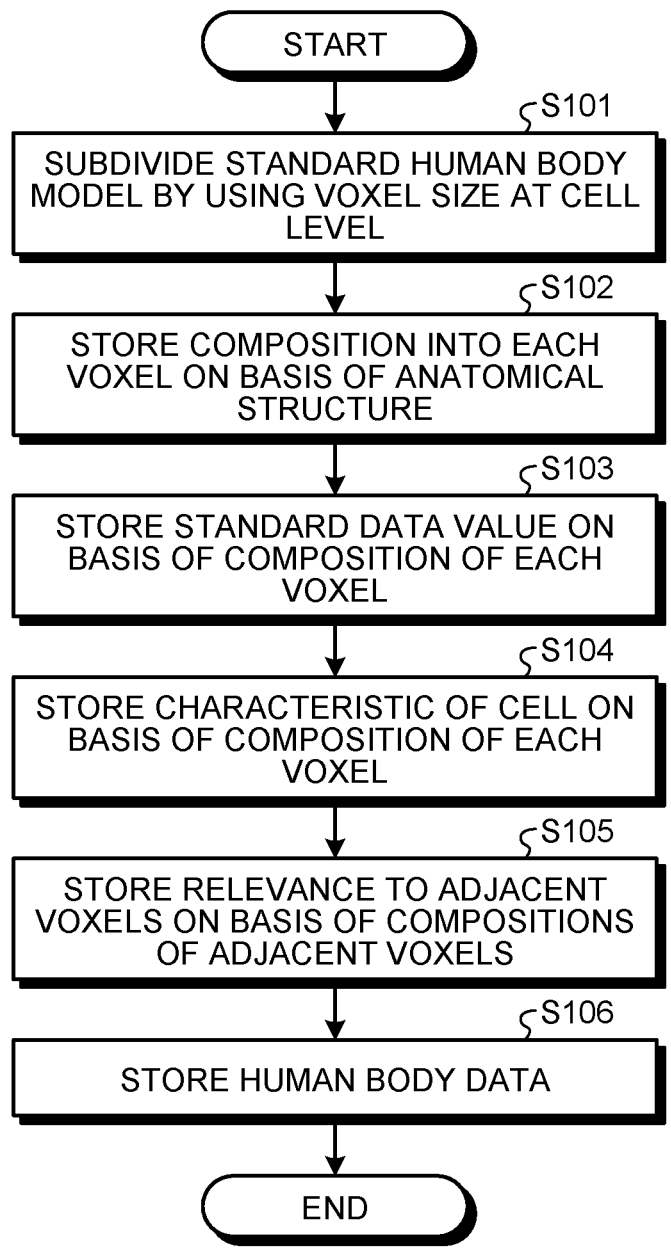
FIG. 9 is a flowchart illustrating a procedure in a process performed by the medical information processing apparatus according to the first embodiment.

Next, a procedure in a process performed by the medical information processing apparatus 1 will be explained. FIG. 9 is a flowchart illustrating the procedure in the process performed by the medical information processing apparatus 1 according to the first embodiment. FIG. 9 illustrates an example of a procedure in the process of generating the human body data 122. Steps S101 through S106 in FIG. 9 are realized as a result of the processing circuitry 15 reading and executing a program corresponding to the generating function 152 from the storage circuitry 12.

As illustrated in FIG. 9, the processing circuitry 15 subdivides the standard human body model obtained on the basis of the structure data 121 by using the voxel size at the cell level (step S101) and stores the composition information into each of the voxels on the basis of the anatomical structure (step S102). After that, on the basis of the composition of the each of the voxels based on the anatomical structure, the processing circuitry 15 stores a standard data value into each of the voxels (step S103).

Further, on the basis of the composition of each of the voxels, the processing circuitry 15 stores a characteristic of the cell (step S104) and further stores the relevance to the adjacent voxels into each of the voxels on the basis of the compositions of the adjacent voxels (step S105). After that, the processing circuitry 15 stores the generated human body data into the storage circuitry 12 (step S106).

Figure 10:
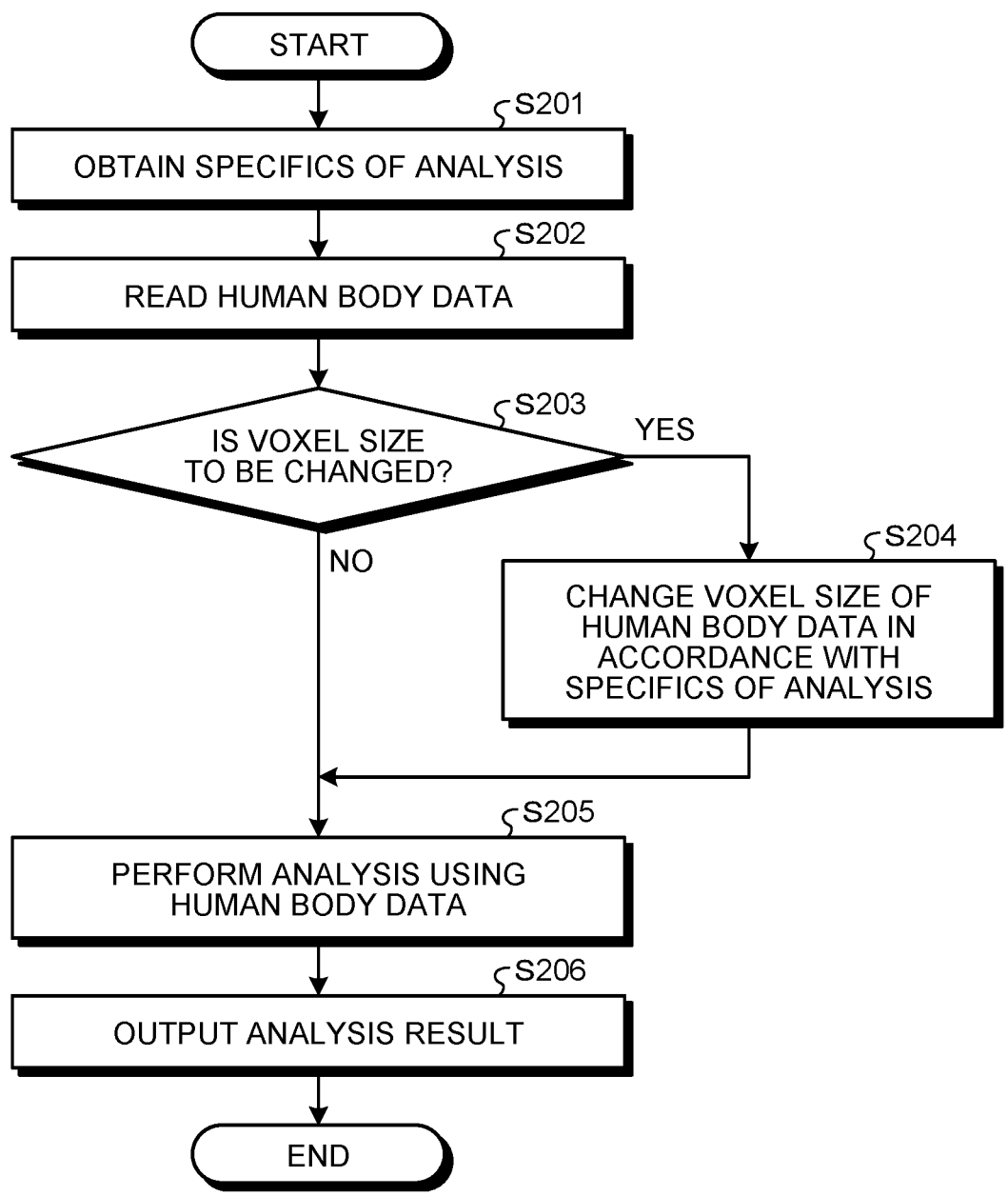
FIG. 10 is a flowchart illustrating a procedure in another process performed by the medical information processing apparatus according to the first embodiment.

FIG. 10 is a flowchart illustrating a procedure in a process performed by the medical information processing apparatus 1 according to the first embodiment. In this situation, FIG. 10 is an example of a procedure in an analyzing process using the human body data 122. Steps S201 through S206 in FIG. 10 are realized as a result of the processing circuitry 15 reading and executing a program corresponding to the analyzing function 153 from the storage circuitry 12.

For example, upon receipt of an instruction related to the analyzing process via the input interface 13, the processing circuitry 15 obtains specifics of the analysis as illustrated in FIG. 10 (step S201) and reads human body data 122 corresponding to a site to be analyzed, from the storage circuitry 12 (step S202). After that, the processing circuitry 15 judges whether or not the voxel size is to be changed on the basis of the specifics of the analysis (step S203).

In this situation, when the voxel size is to be changed (step S203: Yes), the processing circuitry 15 changes the voxel size of the human body data 122 corresponding to the size to be analyzed in accordance with the specifics of the analysis (step S204) and performs the analysis by using the human body data 122 of which the voxel size has been changed (step S205). On the contrary, when the voxel size is not to be changed at step S203 (step S203: No), the processing circuitry 15 performs the analysis by using the human body data 122 read from the storage circuitry 12 (step S205). After that, the processing circuitry 15 outputs an analysis result (step S206).

As explained above, according to the first embodiment, the storage circuitry 12 is configured to store therein the human body data 122 structured with the plurality of voxels. The generating function 152 is configured to generate the human body data, by causing each of the voxels in the human body data to store therein the composition information based on the information about the anatomical structure of the human body, the data values based on the medical image data, and the relevance to the adjacent voxels. Consequently, the medical information processing apparatus 1 according to the first embodiment is able to generate the human body data with which it is possible to perform the imaging simulations under the various conditions and thus makes it possible to provide the human body data that can be used in the various types of analyses.

Further, according to the first embodiment, the generating function 152 is configured to identify the tissue of the human body corresponding to each of the voxels structuring the subdivided data on the basis of the information about the anatomical structure and to further cause each of the voxels to hold therein the composition information of the identified tissue. Consequently, the medical information processing apparatus 1 according to the first embodiment makes it possible to perform the analysis using the composition information based on the anatomical structure.

Furthermore, according to the first embodiment, the generating function 152 is configured to cause each of the voxels in the subdivided data to hold therein the relevance represented by one or both of: the composition information of the adjacent voxels; and the characteristic indicating the relevance to the tissue corresponding to the adjacent voxels. Consequently, the medical information processing apparatus 1 according to the first embodiment makes it possible to perform, with respect to the voxels, the analysis taking the information about the surrounding tissues into consideration.

In addition, according to the first embodiment, the generating function 152 is configured to cause each of the voxels in the human body data to hold therein the composition information of the adjacent voxels, the information about the tissue to which the adjacent voxels belong, and the information about the physical property which the voxel has in relation to the adjacent voxels, so as to be kept in correspondence with the directions of adjacency of the adjacent voxels. Consequently, the medical information processing apparatus 1 according to the first embodiment makes it possible to perform, with respect to the voxels, an analysis taking the relevance to the surrounding tissues into consideration further in detail.

Further, according to the first embodiment, the generating function 152 is configured to generate the human body data by virtually changing the size of the voxels in the human body data 122 stored in the storage circuitry 12, in accordance with the purpose of use of the human body data. Consequently, the medical information processing apparatus 1 according to the first embodiment makes it possible to perform the imaging simulation by changing the voxel size in accordance with the purpose. For example, the medical information processing apparatus 1 according to the first embodiment also makes it possible to perform the imaging simulation using the information at the cell level.

Furthermore, according to the first embodiment, the generating function 152 is configured to form the subdivided data in which the additional voxels that are made invisible are appended to each of the plurality of voxels. Further, the generating function 152 is configured to use the additional voxels that are made visible as the voxels corresponding to the tissue enlarged due to cell proliferation. Consequently, the medical information processing apparatus 1 according to the first embodiment makes it possible to easily generate the human body data corresponding to the situation of the enlargement due to the cell proliferation.

In addition, according to the first embodiment, the analyzing function 153 is configured to perform the analyzing process by using the data of the voxels in the human body data and to output the result of the analyzing process. Consequently, the medical information processing apparatus 1 according to the first embodiment makes it possible to perform the various types of analyses.

Further, according to the first embodiment, the analyzing function 153 is configured to calculate the simulation image of the imaging process performed by the medical image diagnosis apparatus, by using the data of the voxels in the human body data. Consequently, the medical information processing apparatus 1 according to the first embodiment makes it possible to obtain the various types of simulation images.

Furthermore, according to the first embodiment, the analyzing function 153 is configured to calculate the simulation image, by changing the size of the voxels in the human body data in accordance with the apparatus condition of the medical image diagnosis apparatus, further calculating the data values in the post-change voxels by using the data values stored in the voxels in the human body data before the size change, and using the human body data being structured with the voxels of which the size has been changed and holding therein the calculated data. Consequently, the medical information processing apparatus 1 according to the first embodiment makes it possible to perform the simulations while diversely changing the apparatus condition.

In addition, according to the first embodiment, the analyzing function 153 is configured to calculate the simulation image, by changing the size of the voxels in the human body data in accordance with the imaging parameter of the imaging process performed by the medical image diagnosis apparatus, further calculating the data values in the post-change voxels by using the data values stored in the voxels in the human body data before the size change, and using the human body data being structured with the voxels of which the size has been changed and holding therein the calculated data. Consequently, the medical information processing apparatus 1 according to the first embodiment makes it possible to perform the simulation corresponding to the imaging parameter.

Further, according to the first embodiment, the analyzing function 153 is configured to generate the virtual ultrasound image by estimating the ultrasound wave to be generated by the transducer elements of the ultrasound probe on the basis of the geometry and the imaging parameter of the ultrasound probe and further simulating the propagation of the estimated ultrasound wave on the basis of the acoustic impedance stored in each of the voxels in the human body data. Consequently, the medical information processing apparatus 1 according to the first embodiment makes it possible to obtain the simulation image corresponding to the geometry and the imaging parameter of the ultrasound probe.

Furthermore, according to the first embodiment, the analyzing function 153 is capable of performing the virtual imaging process through the simulation by using the parameter (the data values) of the voxels. The Images resulting from a plurality of virtual imaging processes performed in this manner may be used as training data in machine learning, for example.

In one example, the analyzing function 153 is configured to generate the plurality of pieces of human body data 122 by varying the parameters (the data values) held in each of the voxels depending on the levels of malignancy of cancer and to further perform the virtual scan by using each of the generated pieces of human body data 122. The analyzing function 153 is configured to store the simulation images obtained through the virtual scans into the storage circuitry 12 so as to be kept in correspondence with the levels of malignancy of cancer. It is possible to use the simulation images obtained in this manner as training data corresponding to the different levels of malignancy of cancer.

Second Embodiment

Figure 11:
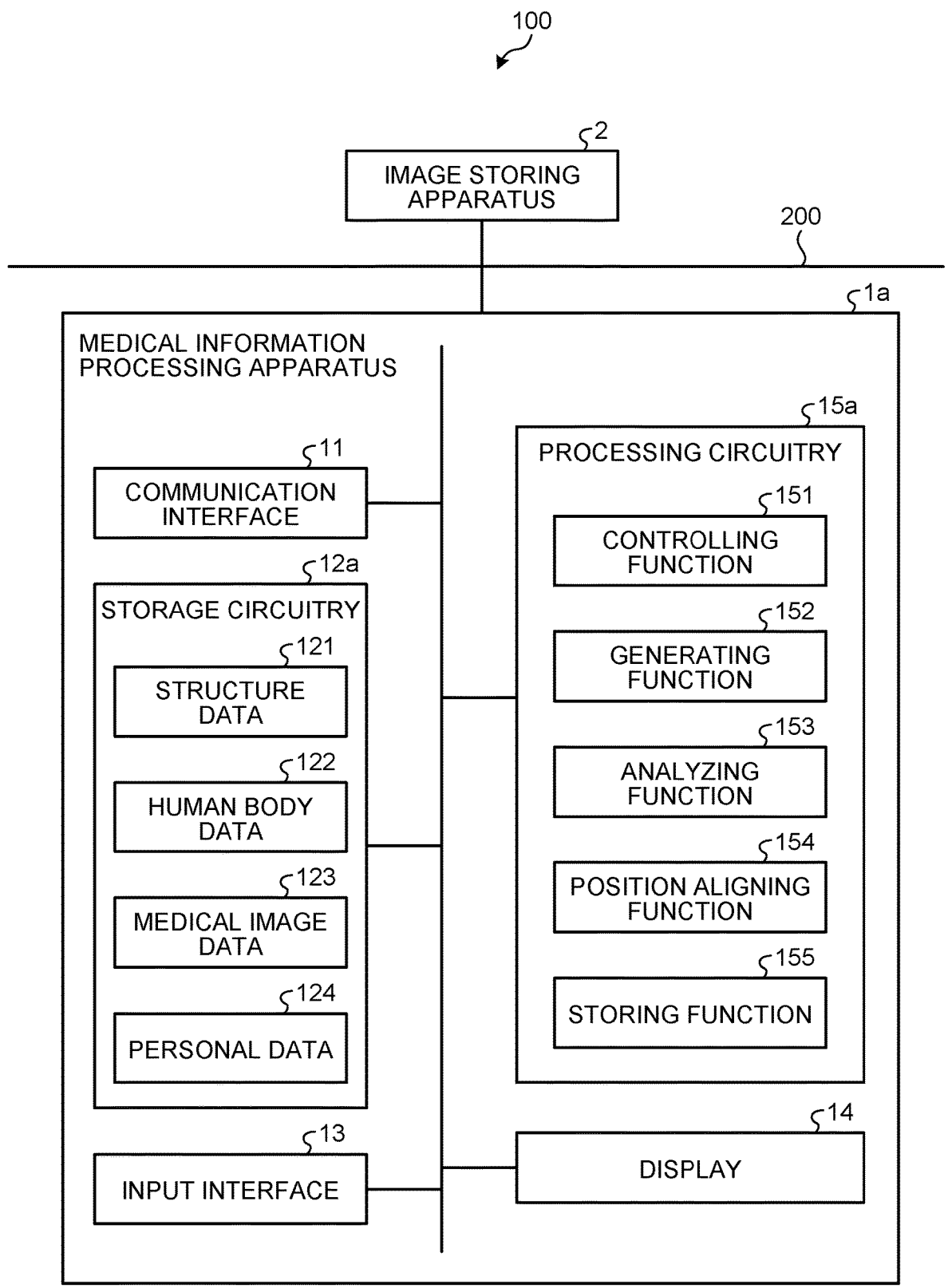
FIG. 11 is a block diagram illustrating an exemplary configuration of a medical information processing apparatus according to a second embodiment.

In the first embodiment described above, the example was explained in which the human body data 122 is generated and used in the analyses. In a second embodiment, an example will be explained in which human body data is used for accumulating personal data. FIG. 11 is a block diagram illustrating an exemplary configuration of a medical information processing apparatus 1a according to the second embodiment. The medical information processing apparatus 1a according to the second embodiment is different from the medical information processing apparatus 1 according to the first embodiment in that a storage circuitry 12a stores therein medical image data 123 and personal data 124 and that processing circuitry 15a executes a position aligning function 154 and a storing function 155. The following explanation will focus on these differences.

As illustrated in FIG. 11, the medical information processing apparatus 1a according to the second embodiment is connected to an image storing apparatus 2 via a network 200, while being included in a medical information processing system 100. The image storing apparatus 2 is configured to store therein medical images acquired by a medical image diagnosis apparatus (not illustrated). For example, the medical image diagnosis apparatus may be an X-ray diagnosis apparatus, an X-ray Computed Tomography (CT) apparatus, a Magnetic Resonance Imaging (MRI) apparatus, an ultrasound diagnosis apparatus, a Single Photon Emission Computed Tomography (SPECT) apparatus, a Positron Emission computed Tomography (PET) apparatus, or the like.

The image storing apparatus 2 is realized by using a server apparatus or the like and is configured to store medical image data received from the medical image diagnosis apparatus into a storage circuit thereof. Further, the image storing apparatus 2 is configured to transmit the medical image data to the medical information processing apparatus 1a.

The storage circuitry 12a according to the second embodiment is configured to store therein the medical image data 123 and the personal data 124. The medical image data 123 is three-dimensional medical image data acquired from an examined subject (hereinafter, "subject") by the medical image diagnosis apparatus and stored in the image storing apparatus 2. The controlling function 151 is configured to obtain the medical image data 123 from the image storing apparatus 2 for each subject, via the communication interface 11 and to store the obtained medical image data 123 into the storage circuitry 12a.

The personal data 124 is data generated and stored through a process performed by the processing circuitry 15a. More specifically, the personal data 124 is data obtained by storing an examination result of an individual person (hereinafter, "individual") into the human body data 122.

The position aligning function 154 is configured to perform a position aligning process (a registration) between the human body data 122 and the the-dimensional medical image data 123 acquired from the subject. For example, the position aligning function 154 is configured to extract an anatomical landmark included in the human body data 122 on the basis of information about an anatomical structure of the human body data 122. Further, the position aligning function 154 is configured to extract an anatomical landmark included in the three-dimensional medical image data. In this situation, the anatomical landmark is a point indicating a feature of a site such as a specific bone, organ, blood vessel, nerve, or lumen.

Further, the position aligning function 154 performs the registration between the human body data 122 and the medical image data 123 by comparing the anatomical landmark included in the human body data 122 with the anatomical landmark included in the three-dimensional medical image data and further changing the shape of the image so that the corresponding anatomical landmarks match.

On the basis of a result of the registration, the storing function 155 is configured to identify voxels in the human body data 122 corresponding to the voxels in the medical image data 123 and to further store, into the storage circuitry 12a, personal data obtained by causing the specified voxels to hold therein the data values from the voxels in the medical image data 123. In this situation, the storing function 155 performs a storing process corresponding to the voxel size of the human body data 122 stored in the storage circuitry 12a. For example, when the voxel size of the human body data 122 stored in the storage circuitry 12a is the same as the voxel size of the medical image data 123, the storing function 155 generates the personal data 124 by causing the value from each of the voxels in the medical image data 123 to be stored in a corresponding one of the voxels in the human body data 122.

In contrast, when the voxel size of the human body data 122 stored in the storage circuitry 12a is smaller (e.g., at the cell level) than the voxel size of the medical image data 123, the storing function 155 extracts a plurality of voxels corresponding to one voxel in the medical image data 123 from the human body data 122. Further, the storing function 155 generates the personal data 124 by causing each of all the extracted plurality of voxels to store therein the data value from the one corresponding voxel.

For example, the storing function 155 causes either a CT value or an X-ray attenuation coefficient from one voxel in the CT image data acquired from the chest of subject A to be stored in each of a plurality of voxels extracted from the human body data. The storing function 155 generates personal data of subject A, by similarly causing each of all the CT values or X-ray attenuation coefficients in the CT image data to be stored into a plurality of corresponding voxels in the human body data and further stores the generated personal data into the storage circuitry 12a.

In this situation, the storing function 155 stores the data values in the medical image data acquired from the single subject into the single piece of human body data 122. For example, when subject A further has acquired ultrasound image data of the abdomen and MR image data of the head, the position aligning function 154 performs a registration between the human body data 122 storing therein the CT values or the X-ray attenuation coefficients and each of the pieces of medical image data. On the basis of a result of the registration, the storing function 155 further causes each of the voxels in the human body data 122 storing therein the CT values or the X-ray attenuation coefficients to store therein data values from the ultrasound image data and data values from the MR image data.

In other words, by storing all the data of the single subject into the single piece of human body data, the storing function 155 makes it possible to realize an arrangement in which the personal data 124 centrally manages the various types of data.

Further, the storing function 155 is configured to store data from the medical image data before and after a reconstruction so as to be kept in association with the human body data. More specifically, the storing function 155 causes the data before and after the reconstruction to be stored in the position within the human body data corresponding to the acquisition position of the medical image data, so as to be kept in correspondence. With this arrangement, it is possible to perform a process using the original data, by simply reading the standard data of the subject.

Further, the storing function 155 is capable of appending subject information of the subject to the personal data. For example, the storing function 155 stores electronic medical record data, the name, the gender, the date of birth, a face photograph, genome information, PH data, and data of daily activities of the subject (e.g., weight, blood pressure, exercise amounts, salt intakes, and urine data), so as to be kept in correspondence with the personal data 124. In this situation, the data of the daily activities is acquired on a daily basis by various types of wearable devices and an Internet of Things (IoT) toilet configured to analyze a urine components with a sensor attached thereto, so that the data is transmitted to the medical information processing apparatus 1a via a communication device. The medical information processing apparatus 1a is configured to manage the received data of the daily activities so as to be kept in correspondence with the corresponding personal data on the basis of IDs.

In response to a request to read the personal data 124, the controlling function 151 is configured to read and output the requested personal data 124 from the storage circuitry 12. In this situation, at the time of reading the personal data 124, a process to authenticate the individual is performed. For example, when authentication has been carried out through an input of an ID and face authentication, the controlling function 151 reads and outputs the requested personal data 124 from the storage circuitry 12.

As explained above, the medical information processing apparatus 1a according to the second embodiment is configured to generate and manage the personal data 124 obtained by putting together, while using the human body data 122, the medical image data and the subject information actually acquired from the subject. For example, by accumulating and managing the personal data 124 of a large number of subjects while using the medical information processing apparatus 1a, it is possible to construct a system capable of providing a third party with the accumulated personal data 124.

Figure 12:
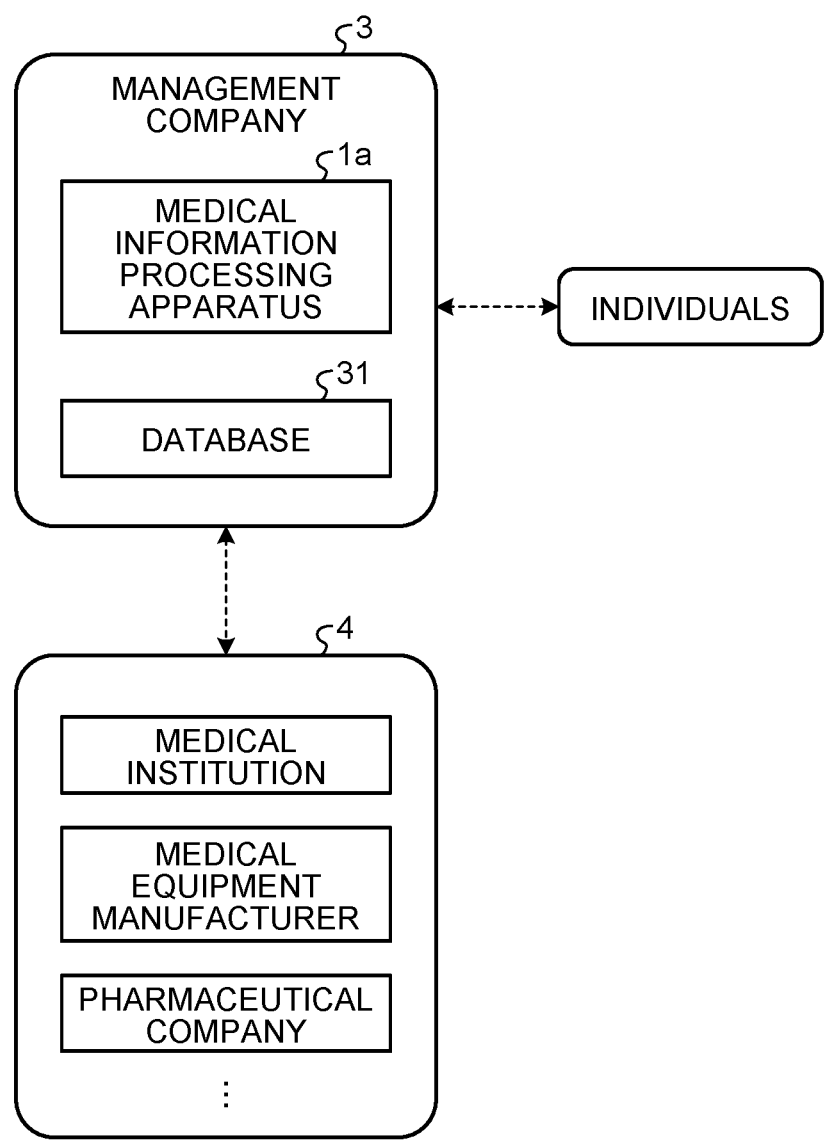
FIG. 12 is a diagram for explaining an outline of a data management system according to the second embodiment.

FIG. 12 is a diagram for explaining an outline of a data management system according to the second embodiment. As illustrated in FIG. 12, in the data management system according to the second embodiment, the medical information processing apparatus 1a is provided in a network and is configured to accumulate the personal data described above by using data obtained from individual people. The medical information processing apparatus 1a is operated and managed by a management company 3. The management company 3 has a database 31 configured to accumulate the personal data generated by the medical information processing apparatus 1a.

The management company 3 issues a management brochure serving as a proof that data is being provided, to any individual who wishes to use the data management system. Further, the management company 3 issues an ID and asks each individual to provide authentication information (a face photograph). Each individual manages the management brochure himself/herself and, when having undergone a medical examination at a medical institution, requests the medical institution to provide his/her medical image data for the management company 3.

In response to the request from the individual, the medical institution provides the management company 3 with the medical image data acquired in the medical examination, electronic medical data, and the like. The management company 3 generates personal data 124 by using the data provided by the medical institution and accumulates the personal data 124 in the database 31. Further, the individual makes information accumulated in his/her personal data 124, by transmitting daily activity data to the management company 3. In this situation, when the data is provided by the medical institution for the management company and when the daily activity data is transmitted to the management company 3, it is possible to keep records of the date and time at which the data was provided and specifics of the provided information, in the management brochure managed by the individual. By keeping the records in the management brochure, the individual is able to understand the state of the personal data 124 at present.

By having the data management system used by a large number of individuals, the management company 3 accumulates a large number of pieces of personal data 124. In this situation, in order to have the data management system used by the large number of individuals, the management company 3 may pay a fee for the provision of the data, for example.

As described above, when the personal data has been accumulated as a result of the large number of individuals using the data management system, the management company 3 operates a data provision service by which the accumulated personal data is provided. For example, the management company 3 provides data recipients 4 receiving the data provision service with the personal data 124 in exchange for a fee corresponding to what is provided.

In this situation, the data provision service is operated in such a manner that the personal data provided by the management company 3 for each of the data recipients 4 is only certain data for which the individual gave permission for use. For example, when an individual applies for the use of the data provision service, the management company 3 asks the individual whether or not he/she permits the data to be provided for a third party. When whether the permission is given or not has been checked, the storing function 155 stores information indicating the presence/absence of the permission for use into the database 31 so as to be appended to the personal data, as subject information of the subject.

In response to a request to use the data provision service from any of the data recipients 4, the controlling function 151 outputs the personal data to which the permission for use is appended. For example, a medical institution being one of the data recipients 4 is able to streamline medical examinations carried out at the institution, by re-using the medical image data appended to the personal data. Further, a pharmaceutical company being another one of the data recipients 4 is able to use the genome information appended to the personal data for research and development.

Furthermore, the management company 3 is also able to provide the human body data 122 in the data provision service. As described above, in the human body data 122, it is possible to arbitrarily change the size of the voxels (e.g., to reduce the size down to the cell level). Accordingly, even when the focal point size of the virtual X-ray tube 5 or the size of the detecting elements in the virtual X-ray detector 6 is reduced, it is possible to accurately calculate absorption of the passing X-rays. Consequently, by using the human body data 122, it is possible to realize, through the simulation, a virtual CT scan using the virtual X-ray tube 5 and the virtual X-ray detector 6 having various focal point sizes and detecting element sizes.

Consequently, a medical equipment manufacturer being another one of the data recipients 4 is able to enhance efficiency in developing products, by receiving the provision service of the human body data 122 and simulating a virtual CT scan performed on the human body data 122 under a condition set by the manufacturer.

Further, each of the voxels in the human body data 122 holds therein the standard data values related to various types of medical image diagnosis apparatuses (e.g., an MRI apparatus, an ultrasound diagnosis apparatus, and a PET apparatus). Consequently, the medical equipment manufacturer being one of the data recipients 4 is able to improve efficiency in developing products such as various types of medical image diagnosis apparatuses, by performing a virtual scan on the human body data 122 with respect to the various types of medical image diagnosis apparatuses and calculating images under various conditions through simulations.

Furthermore, each of the voxels in the human body data 122 holds therein the relevance to the adjacent voxels. Accordingly, the medical equipment manufacturer being one of the data recipients 4 calculates, through simulations, movements of joints and movements of blood flows in blood vessels, by using the information about the relevance to the adjacent voxels. Further, the medical equipment manufacturer is able to improve efficiency in developing imaging methods related to the joint movements and the blood flow movements, by implementing results of the imaging simulations on various types of medical image diagnosis apparatuses under various conditions.

The management company 3 operates and manages the data provision service described above by providing the data recipients 4 with the accumulated personal data 124 and human body data 122 and receiving the fees. For example, the management company may only provide the personal data 124 and the human body data 122. In another example, the management company may provide the personal data 124 and the human body data 122 and also provide analyses using these pieces of data.

Next, the data size of the human body data 122 (the personal data 124) described above will be explained. When the human body data 122 is generated so as to have a voxel size at the cell level, for example, the human body is defined as "the head: 30 $cm^3$"; "the chest and the abdomen: 70 cm×40 cm×30 cm"; "the legs: (70 cm×20 cm×20 cm)×2"; and "the arms: (50 cm×10 cm×10 cm)×2", whereas the size of each cell is defined as "10 μm". Each of the voxels stores therein the composition information, the data values, and the relevance data so as to be kept in correspondence with one another. When data over a plurality of hours is stored, for example, the human body as described herein corresponding to 100 frames shall be prepared.

In the human body data 122, although each of the voxels is provided with the additional voxels, by making the additional voxels invisible (reducing the size thereof by bringing the voxels into the unused state), it is possible to reduce the data size to "⅛" or "1/64" depending on the position.

When the human body data 122 having the volume as described above is generated with the voxels each having a size at the cell level, there are a huge number of voxels, which would make the total data volume large. To cope with this situation, as described in the embodiments above, by generating the human body data 122 with larger voxels (having the same voxel size as that of the medical image data 123), it is possible to realize the human body data 122 of which the total data volume is prevented from being large.

As explained above, according to the second embodiment, the position aligning function 154 is configured to perform the registration between the human body data and the medical image data acquired from the subject. On the basis of the result of the registration, the storing function 155 is configured to identify the voxel in the human body data corresponding to the voxel in the medical image data and to further store, into the storage circuitry 12, the personal data in which the identified voxel is caused to hold therein the data value from the voxel in the medical image data. Consequently, the medical information processing apparatus 1a according to the second embodiment makes it possible to centrally manage the personal data by using the human body data.

Further, according to the second embodiment, the storing function 155 is configured to append the subject information of the subject to the personal data. Consequently, the medical information processing apparatus 1a according to the second embodiment makes it possible to centrally manage the data including the various types of data of the individual.

Furthermore, according to the second embodiment, the storing function 155 is configured to cause the database 31 to accumulate the personal data to which the information indicating the presence/absence of the permission for use is appended, as the subject information of the subject. The controlling function 151 is configured to output the personal data to which the permission for use is appended in response to the use request received from the user of the personal data. Consequently, the medical information processing apparatus 1a according to the second embodiment makes it possible to use and manage the personal data under permission of the individual.

Other Embodiments

The first and the second embodiments have thus been explained. It is also possible to carry out the present disclosure in various different modes other than those described in the first and the second embodiments above.

In the embodiments described above, the example was explained in which the medical information processing apparatus 1 (or 1a) is configured to generate the human body data 122 and to perform the analysis using the human body data 122; however, possible embodiments are not limited to this example. It is also possible to cause mutually-different apparatuses to perform a different one of the processes. In other words, it is also acceptable to structure a medical information processing apparatus serving as a human body data generating device and configured to perform only the abovementioned processes related to generating the human body data 122; and another medical information processing apparatus serving as an analyzing device and configured to perform only the processes related to the analysis using the human body data 122.

In the medical information processing apparatuses described in the embodiments, the processing functions are stored in the storage circuitry 12 (or 12a) in the form of computer-executable programs. The processing circuitry 15 (or 15a) is a processor configured to realize the functions corresponding to the programs, by reading and executing the programs from the storage circuitry 12 (or 12a). In other words, the processing circuitry 15 (or 15a) that has read the programs has the functions corresponding to the read programs. Further, in the embodiments described above, the example was explained in which the processing functions are realized by the single processing circuit (the processing circuitry 15 or 15a); however, possible embodiments are not limited to this example. For instance, the processing circuitry 15 (or 15a) may be structured by combining together a plurality of independent processors, so that the processing functions are realized as a result of the processors executing the programs. Further, the processing functions of the processing circuitry 15 (or 15a) may be realized as being distributed among or integrated into one or more processing circuits, as appropriate.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The one or more processors realize the functions by reading and executing the programs saved in the storage circuitry 12 (or 12a).

Further, in the embodiments described above, the example was explained in which the storage circuitry 12 (or 12a) stores therein the programs corresponding to the processing functions; however, it is also acceptable to arrange a plurality of storage circuits in a distributed manner, so that the processing circuitry 15 (or 15a) reads a corresponding program from each of the individual storage circuits. Further, instead of saving the programs in the one or more storage circuits, it is also acceptable to directly incorporate the programs in the circuits of the one or more processors. In that situation, the one or more processors realize the functions by reading and executing the programs incorporated in the circuits thereof.

The constituent elements of the apparatuses and devices according to the above embodiments are based on functional concepts. Thus, it is not necessary to physically configure the constituent elements as indicated in the drawings. In other words, specific modes of distribution and integration of the apparatuses and devices are not limited to those illustrated in the drawings. It is acceptable to functionally or physically distribute or integrate all or a part of the apparatuses and devices in any arbitrary units, depending on various loads and the status of use. Further, all or an arbitrary part of the processing functions performed by the apparatuses and devices may be realized by a CPU and a program analyzed and executed by the CPU or may be realized as hardware using wired logic.

It is possible to realize the medical information processing methods explained in the above embodiments, by causing a computer such as a personal computer or a workstation to execute a medical information processing program prepared in advance. The medical information processing program may be distributed via a network such as the Internet. Further, the medical information processing program may be executed, as being recorded on a computer-readable non-transitory recording medium such as a hard disk, a flexible disk (FD), a Compact Disk Read-Only Memory (CD-ROM), a Magneto Optical (MO) disk, a Digital Versatile Disk (DVD) or the like and being read by a computer from the recording medium.

According to at least one aspect of the embodiments described above, it is possible to provide the human body data that can be used in various types of analyses.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus, comprising:
   storage circuitry configured to store therein human body data structured with a plurality of voxels; and
   processing circuitry configured to generate the human body data by causing each of the voxels in the human body data to store therein composition information based on information about an anatomical structure of a human body, a data value based on medical image data, and relevance to an adjacent voxel, wherein
   the processing circuitry is further configured to cause information of the adjacent voxel to be held in each voxel of the voxels in the human body data while being kept in correspondence with a direction of adjacency.

2. The medical information processing apparatus according to claim 1, wherein the processing circuitry is further configured to identify a tissue in the human body corresponding to each of the voxels structuring the human body data, based on the information about the anatomical structure, and further cause each of the voxels to hold therein composition information of the identified tissue.

3. The medical information processing apparatus according to claim 1, wherein the processing circuitry is further configured to cause each of the voxels in the human body data to hold therein the relevance, which is represented by one or both of:
   composition information of the adjacent voxel; and
   a characteristic indicating a relevance to a tissue corresponding to the adjacent voxel, so as to be kept in correspondence with the direction of adjacency of the adjacent voxel.

4. The medical information processing apparatus according to claim 3, wherein the processing circuitry is further configured to cause each of the voxels in the human body data to hold therein the composition information of the adjacent cell, information about a tissue to which the adjacent voxel belongs, and information about a physical property that the voxel has in relation to the adjacent voxel, so as to be kept in correspondence with the direction of adjacency of the adjacent voxel.

5. The medical information processing apparatus according to claim 1, wherein the processing circuitry is further configured to generate the human body data by virtually changing a size of the voxels in the human body data stored in the storage circuitry, in accordance with a purpose of use of the human body data.

6. The medical information processing apparatus according to claim 1, wherein the processing circuitry is further configured to generate the human body data by appending an additional voxel that is made invisible, to each of the plurality of voxels.

7. The medical information processing apparatus according to claim 6, wherein the processing circuitry is further configured to use the additional voxel that is made visible, as a voxel corresponding to a tissue enlarged due to cell proliferation.

8. The medical information processing apparatus according to claim 1, wherein the processing circuitry is further configured to perform an analyzing process by using data of the voxels in the human body data and output a result of the analyzing process.

9. The medical information processing apparatus according to claim 8, wherein the processing circuitry is further configured to calculate a simulation image of an imaging process performed by a medical image diagnosis apparatus, by using the data of the voxels in the human body data.

10. The medical information processing apparatus according to claim 9, wherein the processing circuitry is further configured to calculate the simulation image by changing a size of the voxels in the human body data in accordance with an apparatus condition of the medical image diagnosis apparatus, calculating data values in post-change voxels by using the data values stored in the voxels in the human body data before the size change, and using human body data that is structured with the voxels of which the size has been changed and holding therein the calculated data.

11. The medical information processing apparatus according to claim 9, wherein the processing circuitry is further configured to calculate the simulation image by changing a size of the voxels in the human body data in accordance with an imaging parameter of an imaging process performed by the medical image diagnosis apparatus, calculating data values in post-change voxels by using the data values stored in the voxels in the human body data before the size change, and using human body data that is structured with the voxels of which the size has been changed and holding therein the calculated data.

12. The medical information processing apparatus according to claim 9, wherein the processing circuitry is further configured to generate a virtual ultrasound image by estimating an ultrasound wave to be generated by transducer elements of an ultrasound probe based on geometry and an imaging parameter of the ultrasound probe, and simulating propagation of the estimated ultrasound wave based on an acoustic impedance stored in each of the voxels in the human body data.

13. The medical information processing apparatus according to claim 1 wherein the processing circuitry is further configured to:
   perform a registration between the human body data and the medical image data acquired from a subject; and
   based on a result of the registration, identify a voxel in the human body data corresponding to a voxel in the medical image data, and store, into the storage circuitry, personal data obtained by causing the identified voxel to hold therein a data value from the voxel in the medical image data.

14. The medical information processing apparatus according to claim 13, wherein the processing circuitry is further configured to append subject information of the subject to the personal data.

15. The medical information processing apparatus according to claim 13, wherein the processing circuitry is further configured to
   accumulate, in the storage circuitry, the personal data having appended thereto information indicating a presence or an absence of permission for use, as subject information of the subject, and
   output the personal data having the permission for use appended thereto, in response to a use request received from a user of the personal data.

16. The medical information processing apparatus according to claim 1, wherein the human body data includes a first voxel, a second voxel adjacent to the first voxel, and a third voxel adjacent to the first voxel, and the processing circuitry is further configured to store composition information of the second voxel and a characteristic indicating a relevance to a tissue corresponding to the second voxel on a second voxel side within the first voxel, and store composition information of the third voxel and a characteristic indicating a relevance to a tissue corresponding to the third voxel on a third voxel side within the first voxel.

17. A medical information processing apparatus, comprising:
storage circuitry configured to store therein human body data structured with a plurality of voxels and to store therein composition information based on information about an anatomical structure of a human body, a data value based on medical image data, and a relevance to an adjacent voxel, so as to be kept in correspondence with each of the voxels in the human body data; and
processing circuitry configured to perform an analyzing process by using data of the voxels in the human body data and to output a result of the analyzing process, wherein the storage circuitry is configured to store therein the human body data in which information of the adjacent voxel is held in each voxel of the voxels while being kept in correspondence with a direction of adjacency.

18. The medical information processing apparatus according to claim 17, wherein the processing circuitry is further configured to calculate a simulation image of an imaging process performed by a medical image diagnosis apparatus, by using the data of the voxels in the human body data.

19. A medical information processing method, comprising:
generating human body data by causing each of a plurality of voxels in human body data structured with the voxels to store therein composition information based on information about an anatomical structure of a human body, a data value in medical image data, and a relevance to an adjacent voxel; and
causing information of the adjacent voxel to be held in each voxel of the voxels in the human body data while being kept in correspondence with a direction of adjacency.

20. A medical information processing method, comprising:
performing an analyzing process by using data of a plurality of voxels in human body data and outputting a result of the analyzing process, the human body data being structured with the plurality of voxels and having stored therein composition information based on information about an anatomical structure of a human body, a data value based on medical image data, and a relevance to an adjacent voxel so as to be kept in correspondence with each of the voxels; and
causing information of the adjacent voxel to be held in each voxel of the voxels while being kept in correspondence with a direction of adjacency.

* * * * *